US007979407B2

(12) United States Patent
Billingsley et al.

(10) Patent No.: US 7,979,407 B2
(45) Date of Patent: Jul. 12, 2011

(54) PUBLICATION OF INFORMATIONAL MESSAGES TO SOFTWARE APPLICATIONS IN A COMPUTING ENVIRONMENT

(75) Inventors: Eric Billingsley, Campbell, CA (US); Daniel T. Kao, San Jose, CA (US); Sheio-Hsien Tai, Milpitas, CA (US); Laura Wong, San Jose, CA (US)

(73) Assignee: eBay Inc., San Jose, CA (US)

( * ) Notice: Subject to any disclaimer, the term of this patent is extended or adjusted under 35 U.S.C. 154(b) by 77 days.

(21) Appl. No.: 12/495,630

(22) Filed: Jun. 30, 2009

(65) Prior Publication Data

US 2010/0011074 A1 Jan. 14, 2010

Related U.S. Application Data

(63) Continuation of application No. 11/140,660, filed on May 27, 2005, now Pat. No. 7,571,195.

(60) Provisional application No. 60/575,498, filed on May 28, 2004.

(51) Int. Cl.
*G06F 17/00* (2006.01)
*G06F 17/30* (2006.01)

(52) U.S. Cl. ......... 707/704; 707/781; 713/153; 713/154

(58) Field of Classification Search ........................ None
See application file for complete search history.

(56) References Cited

U.S. PATENT DOCUMENTS

| | | | | |
|---|---|---|---|---|
| 5,223,827 | A | 6/1993 | Bell et al. | |
| 6,044,372 | A | 3/2000 | Rothfus et al. | |
| 6,885,307 | B2 | 4/2005 | Lockhart et al. | |
| 6,910,070 | B1 | 6/2005 | Mishra et al. | |
| 6,920,468 | B1 * | 7/2005 | Cousins et al. | 1/1 |
| 7,571,195 | B2 | 8/2009 | Billingsley et al. | |
| 2002/0016867 | A1 | 2/2002 | Kampe et al. | |
| 2002/0194347 | A1 * | 12/2002 | Koo et al. | 709/227 |
| 2003/0069874 | A1 * | 4/2003 | Hertzog et al. | 707/1 |
| 2004/0024771 | A1 * | 2/2004 | Jain et al. | 707/100 |
| 2004/0125798 | A1 | 7/2004 | Hondo et al. | |
| 2005/0216421 | A1 | 9/2005 | Barry et al. | |

OTHER PUBLICATIONS

"U.S. Appl. No. 11/140,660, Advisory Action mailed Jan. 16, 2009", 3 pgs.

"U.S. Appl. No. 11/140,660, Final Office Action mailed Nov. 12, 2008", 24 pgs.

(Continued)

*Primary Examiner* — Pierre M Vital
*Assistant Examiner* — Loan T Nguyen
(74) *Attorney, Agent, or Firm* — Schwegman, Lundberg & Woessner, P.A.

(57) ABSTRACT

Systems and methods for publishing information to a plurality of software applications are provided. The methods may comprise identifying a plurality of records based on a last sequential identification code in a high watermark table of a persistent store. The plurality of records may be generated subsequent to a previous record corresponding to the last sequential identification code. A plurality of corresponding messages each corresponding to a record of the plurality of records may be prepared. Each of those messages may then be transmit to at least one software application and may include a most recent message corresponding to a most recent record. In the high water mark table of the persistent store, an updated last sequential identification code may be stored as a pointer for subsequent reference. The updated last sequential identification code may correspond to the most recent message transmitted in the plurality of corresponding messages.

20 Claims, 15 Drawing Sheets

NORMAL PUBLICATION THREAD

OTHER PUBLICATIONS

"U.S. Appl. No. 11/140,660, Non Final Office Action mailed Feb. 5, 2008", 23 pgs.

"U.S. Appl. No. 11/140,660, Non Final Office Action mailed Aug. 3, 2007", 16 pgs.

"U.S. Appl. No. 11/140,660, Notice of Allowance mailed Mar. 23, 2009", 18 pgs.

"U.S. Appl. No. 11/140,660, Response filed Jan. 12, 2009 to Final Office Action mailed Nov. 12, 2008", 30 pgs.

"U.S. Appl. No. 11/140,660, Response filed Jul. 7, 2008 to Non Final Office Action mailed Feb. 5, 2008", 29 pgs.

"U.S. Appl. No. 11/140,660, Response filed Nov. 3, 2007 to Non Final Office Action mailed Aug. 3, 2007", 25 pgs.

"The TIBCO Architecture Method", A Method for architecting Distributed Systems Utilizing TIBCO Software, (online),, [Online]. Retrieved from the Internet: <URL: internet http://axxis.com.mx/tibco/architecture.pdf> Retrieved May 17, 2005., (2002-2004), 79 pgs.

"TIBCO The Power of Now", TIBCO Adapters (online), [Online]. Retrieved from the Internet: <URL: http://www.tibco.com/software/business_intergration/adapters.jsp>, (retrieved on May 17, 2005), 2 pgs.

* cited by examiner

EVENT PROCESSING

HIGH WATER MARK THREAD

RECOVERY REQUEST THREAD

RECOVERY PUBLICATION THREAD

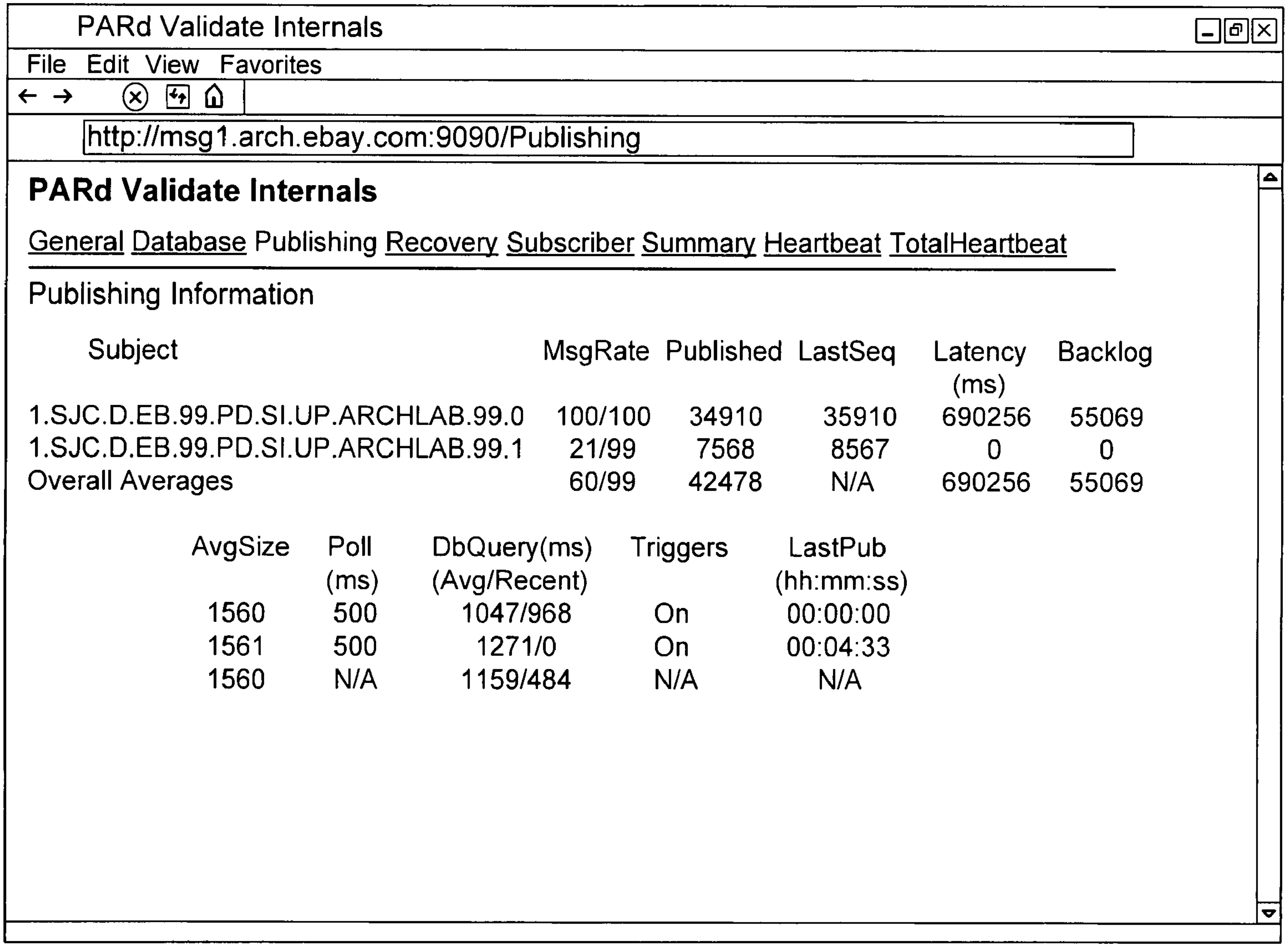

FIG. 9

PARd Validate Internals

File Edit View Favorites http://msg1.arch.ebay.com:9090/Publishing

PARd Validate Internals

General Database Publishing Recovery Subscriber Summary Heartbeat TotalHeartbeat Publishing Information

| Subject | MsgRate | Published | LastSeq | Latency (ms) | Backlog |
|---|---|---|---|---|---|
| 1.SJC.D.EB.99.PD.SI.UP.ARCHLAB.99.0 | 100/100 | 34910 | 35910 | 690256 | 55069 |
| 1.SJC.D.EB.99.PD.SI.UP.ARCHLAB.99.1 | 21/99 | 7568 | 8567 | 0 | 0 |
| Overall Averages | 60/99 | 42478 | N/A | 690256 | 55069 |

| | AvgSize | Poll (ms) | DbQuery(ms) (Avg/Recent) | Triggers | LastPub (hh:mm:ss) |
|---|---|---|---|---|---|
| | 1560 | 500 | 1047/968 | On | 00:00:00 |
| | 1561 | 500 | 1271/0 | On | 00:04:33 |
| | 1560 | N/A | 1159/484 | N/A | N/A |

PARd Validate Internals

General Database Publishing Recovery Subscriber Summary Heartbeat TotalHeartbeat Summary Info

| Subject | Published | RecovMsgs | RecovQueue | Missing |
|---|---|---|---|---|
| 1.SJC.D.EB.99.PD.SI.UP.ARCHLAB.99.0 | 42259 | 14 | 0 | 0 |
| 1.SJC.D.EB.99.PD.SI.UP.ARCHLAB.99.1 | 7568 | 16 | 0 | 16 |
| Totals | 49827 | 30 | 0 | 16 |

| | Latency | Backlog | AvgSize | Triggers | LastPub |
|---|---|---|---|---|---|
| | 690151 | 46069 | 1560 | On | 00:00:00 |
| | 0 | 0 | 1561 | On | 00:05:47 |
| | 690151 | 46069 | 1560 | N/A | N/A |

PUBLICATION OF INFORMATIONAL MESSAGES TO SOFTWARE APPLICATIONS IN A COMPUTING ENVIRONMENT

CROSS-REFERENCE TO RELATED APPLICATION

This application is a continuation of U.S. patent application Ser. No. 11/140,660 filed May 27, 2005 now U.S. Pat. No. 7,571,195 which claims the benefit of U.S. Provisional Application No. 60/575,498, filed May 28, 2004, the entire disclosure of both are hereby incorporated herein by reference.

FIELD OF THE INVENTION

The present invention relates generally to information exchange between disparate software applications running on an online enterprise's computer system, such as an e-commerce business' online enterprise system.

DISCUSSION OF THE RELATED ART

In online enterprise computer systems, such as those servicing an e-commerce site, business site, auctioneer site, etc., there are various disparate software applications running within the same system. These software applications are operable for various purposes, and they exchange information between them to perform specific respective functions in cooperation for a specific purpose. For example, eBay, Inc. of San Jose, Calif., operates a website providing an Internet-based community in which buyers and sellers are brought together to buy and sell various items. The eBay community includes more than a hundred million registered members from around the world. On an average day, there are millions of items listed on eBay, in thousands of topical categories.

The eBay website permits sellers to list items for sale, buyers to bid on items of interest and all eBay users to browse through listed items in an automated, topically arranged website. Sellers list their items for sale by providing information about the item via an online website interface. Such information is added to a persistent store of items. From the persistent store's perspective, each listing of a new item, or a modification to a listing, is an event occurring on the enterprise system that requires a persistent store to be updated. Other events may result from users' interactions with the website, such as bidding, executing payment transactions, etc. These events occur asynchronously, and in large number.

While the persistent store may receive such information directly, it is often necessary to inform the online enterprise system's various other software applications of the occurrence of the event and/or information relating to the event. Such other applications require such information to perform their corresponding functions. In the eBay example above, a billing application may be notified of occurrence of a purchase event to process a payment for the purchase, or a search tool application may be notified of occurrence of an item listing event, so that future searches may return search results including the newly listed item. Accordingly, in connection with such events, associated data must be transferred from the persistent store to the subscribing software application(s) that may need the data.

It is desirable to notify such application(s) at approximately the same time, and quickly after occurrence of the event. Further, it is desirable to accomplish these goals using a minimal amount of system resources, particularly when such events occur with great frequency.

Traditionally, all information relating to events was written to a single persistent store. Each software application periodically (e.g., hourly) queried the persistent store to identify any information added since the last time the same software application had referenced the persistent store. This was a "pull" based model in which each application actively retrieved new information from the persistent store or pulled it from the persistent store. This provides a significant amount of latency, which is undesirable in a very active, dynamic environment, such as the eBay online trading environment.

Subsequently, persistent store messaging software was developed for actively notifying other software applications of a change to a persistent store. One example of such software is the Active Database™ ("ADB") software manufactured and/or distributed by Tibco, Inc. of Palo Alto, Calif. Conceptually, the ADB software functioned such that each time data was written to the persistent store, the software would create a record in a second "shadow" table to record that an event had occurred. Typically, a unique identifier was assigned to each event and stored in both the main table and the shadow table for the purpose of referencing each event. Conventional message publication technology, such as Tibco's Rendezvous software, was then used to multicast a message including related information to multiple software applications that need the information. Thus, the main table stored the detailed information relating to events occurring in the system, and the shadow table stored only a history of events that occurred. Messages sent to other applications may include actual event data retrieved from the main and/or shadow tables. Thus, ADB is an example of a "push" based model. However, ADB requires multiple persistent store queries.

Further, the ADB software also wrote entries to the shadow table to indicate a notification status for each record, e.g., to reflect whether each particular message had been published. More specifically, a column in the shadow table starts out with the state "NEW" for a new record. The state remains unchanged until a corresponding message is published to communicate occurrence of the event to other software applications. After publication of a message for a particular record, the record's respective status field entry in the same column is changed from "NEW" to "COMPLETED" during a write operation to reflect that the corresponding message has been published. Accordingly, a status entry in the shadow table was required to indicate the current publication status for each and every record, and was changed after each publication of the message. This requires a large number of writes to the persistent store, which places a significant processing burden on the persistent store software and/or other system resources. While this burden may be tolerable for certain uses, it has proven to be undesirable in a very active, dynamic environment, such as the eBay online trading environment, in which there are an unusually large number of changes/updates to the persistent store, and in which there is an exceptional need for rapid dissemination of information to other software applications.

BRIEF DESCRIPTION OF THE DRAWINGS

The present invention will now be described by way of example with reference to the following drawings in which:

FIGS. 7-14 are images of an exemplary graphical user interface display in accordance with the present invention.

DETAILED DESCRIPTION OF THE PREFERRED EMBODIMENTS

Figure 1:
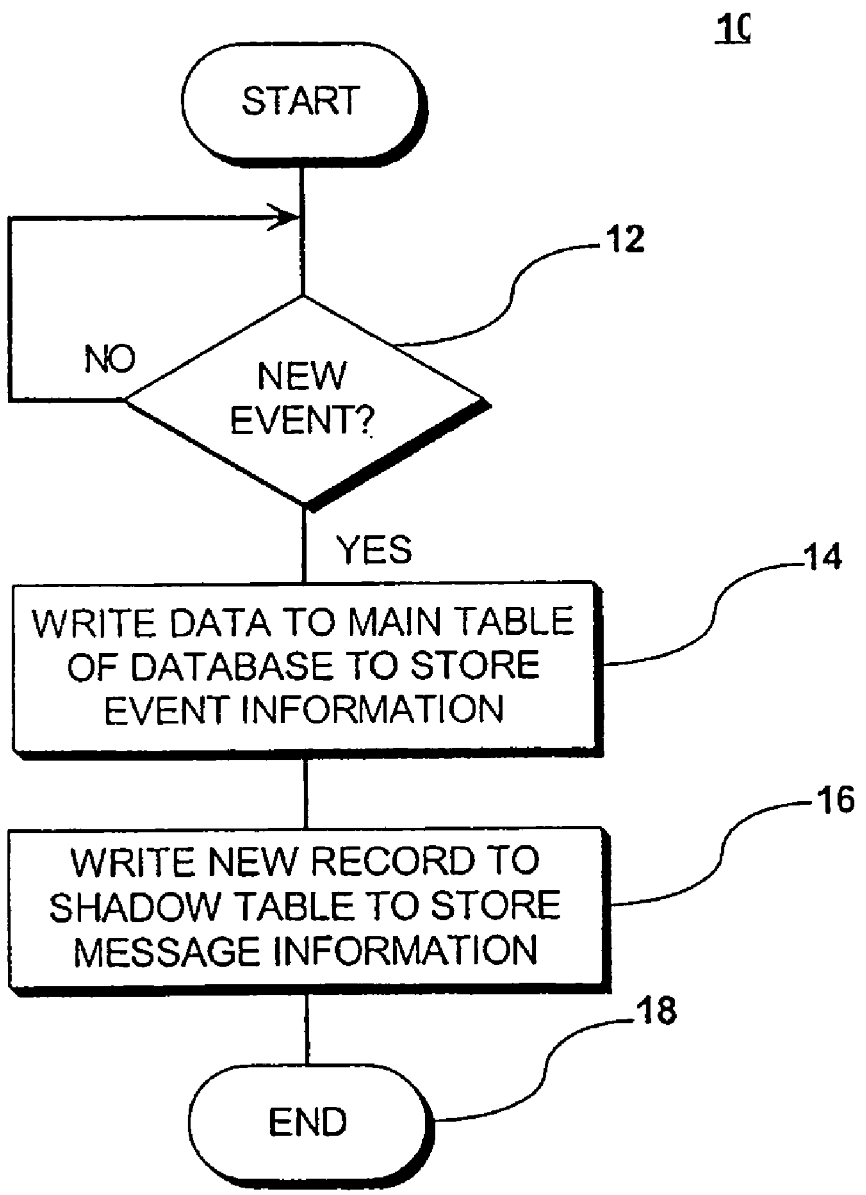
FIG. 1 is a flow diagram illustrating an exemplary data capture and event processing in accordance with the present invention.

The present invention provides technology that may be implemented and used as an alternative to conventional persistent store messaging software, such as ADB. This technology may be implemented in a software application/program module, which is sometimes referred to herein as PARd (Publishing and Recovery Daemon). A method and/or system implementing the technology operates on a "push" based model. Accordingly, upon occurrence of an event within an online enterprise system, the inventive method/system automatically sends a message to the system's other software applications, referred to as "subscribing applications" or "subscribers," to actively inform them that the event occurred on the enterprise system, and to actively communicate the event related data. The individual subscribing applications do not need to "pull" the event information from a database or other persistent data store (referred to collectively herein as a "persistent store").

During normal publication, records are read from the persistent store in batch, then published in messages as deemed appropriate, e.g. in smaller batches. By reading records from the persistent store in batch, rather than for each record, system resources are conserved by eliminating read operations.

The present invention uses a newly configured shadow table in addition to the persistent store main table. Instead of the conventional shadow table, which included in each record data, an identification number, and a publication status field, the newly configured shadow table includes in each record only data and a sequentially ordered identification number.

Because the shadow table excludes the status field, the need to rely upon and update status fields is eliminated. Instead, the present invention relies upon sequentially assigned codes of records in the shadow table, and an additional table that acts as a high water mark table. This high water mark table stores the sequence number of the last (highest sequence code) message published for a group of messages, and thus serves as a pointer to where publication of messages/records last stopped. Accordingly, there is no need to write a status change to the persistent store for each record and/or publication. Instead, a single entry may be written for multiple records to identify the last message published in the batch. Updating of the high water mark ("HWM") table is not tied to the batches that are read from the persistent store. Instead a separate thread uses a timer to update the table periodically (e.g. every minute). This time is configurable. Writes to a persistent store are very expensive in terms of system resources, and thus the elimination of many such writes is advantageous, and particularly advantageous in a very active, dynamic environment, such as the eBay online trading environment.

Further, by relying upon sequential and/or consecutive sequence codes, it is readily apparent from a gap in the sequence codes of received messages when a record/message is missing. This allows subscribers to request that a particular one or more missing messages be resent.

Further, the shadow table is new in that it is structured as a high performance persistent store structure, such as an Index Ordered Table (IOT) in the context of an Oracle database. This means that the shadow table includes an index used to quickly identify the records in the table. Unlike conventional shadow tables, which stored indices as separate tables, the high performance shadow table of the present invention allows for efficient processing and eliminates a query "hop" from the index table to the shadow table.

In one embodiment, a view is used to check for new records to publish and to read the data to be published in the messages. The view allows the data in the main table and in the shadow table to be combined into a single object. By using a view, there is no need to know the name of the main table or its relationship to the shadow table. This information is transparent. Also, since a single object is used, it can read the data from both the main table and the shadow table at the same time. Therefore, multiple queries of the persistent store are not needed. The view can not only be used to combine data from multiple tables, but also to selectively remove data. If the main table includes some data that does not need to be in the published messages, then the view can exclude this data from its definition.

Persistent store structure often changes over time, resulting in addition and/or deletion of columns, etc. Conventional software such as ADB used a static configuration for its messages, which was established during software development, before future changes in persistent store structure could be known. A subsequent change in the persistent store structure therefore results in erroneous or incomplete information in the messages, which are statically configured to pull data from certain columns, because these columns have changed as a result of a subsequent change to the persistent store structure. As a result, significant maintenance is required from a development team to update the static configuration file each time there is a change in persistent store structure.

In contrast, the present invention periodically queries the persistent store to identify any changes in the view, and automatically modifies the message structure to reflect these changes. This minimizes the above-referenced need for development team resources, and allows information to be quickly and readily available without any intermediate need for changes to the message/publication mechanism as new information is added to the persistent store table. Development team resources may still be needed to change the definition of the view, but this type of change can be done much faster than a code change or a static configuration change. This reduces the time to market of new website features, etc.

Relative to conventional persistent store messaging software such as ADB, the present invention may publish messages at a higher rate and thus reduce backlog conditions, may place less CPU load on the persistent store server, may provide less CPU load on the system, may provide improved diagnostic and monitoring capability, may reduce the time for product development to publish a table, and combines normal and recovery publishing into a single process.

Accordingly, the present invention has at least two notable aspects, one relating to normal publishing of messages to communicate new information to various other software applications of a computer system, and another relating to recovery publishing to republish any missed messages to the various software applications in the event that there was an error in communicating information during normal publishing. These and other aspects of the present invention are discussed in detail below.

Event Processing

Figure 2:
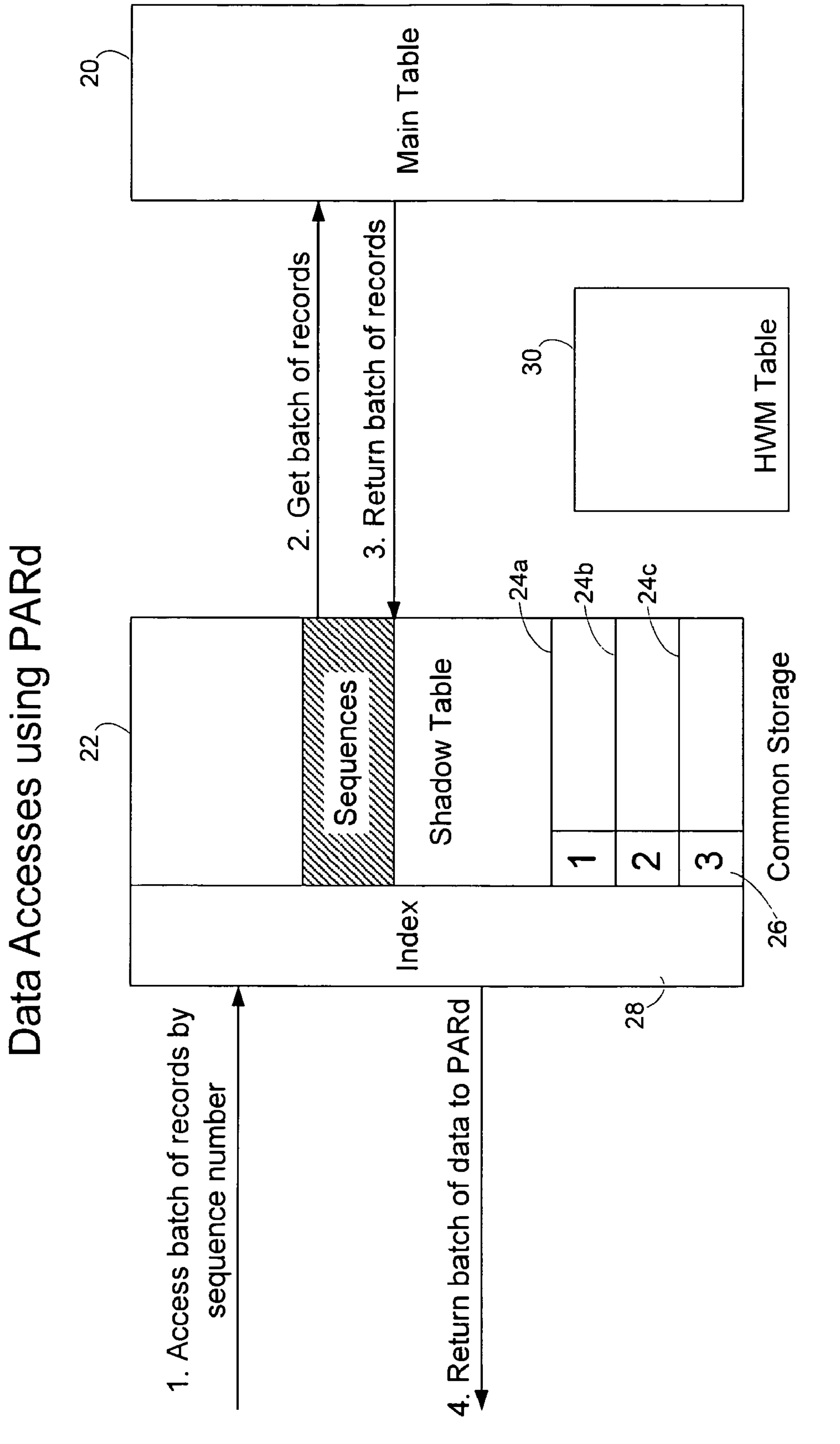
FIG. 2 is a diagrammatic view of persistent store tables and accesses in accordance with an exemplary embodiment of the present invention.

During normal operation, data is captured in a persistent store or other persistent data store (referred to collectively herein as a "persistent store") as event related processing occurs. Referring to FIGS. 1 and 2, event processing begins with monitoring the system until it is determined that an event has occurred, as shown at 12 in the flow diagram 10 of FIG. 2. This monitoring and/a detection may be performed in a conventional manner. As used herein, an "event" involves a change to the main table of a persistent store. By way of example, this may involve addition of a new record, updating of an existing record, or deletion of an existing record, all of which are considered herein to involve writing to the persistent store. The persistent store is then updated by writing data to the main table 20 (FIG. 2) to reflect event information, as shown at step 14. This may be performed in a conventional manner, by example, using independent software that is outside the scope of the present invention.

Additionally, certain information is stored to a second table, referred to herein as a shadow table 22, responsive to occurrence of the event, as shown at step 16 in FIG. 1. The information is stored in the shadow table 22 in the form of a new record 24*c* having a respective identification code 26. While the concept of storing certain information in a second table is not itself new, the inventive shadow table is a particular new table that has a particular new purpose in the context of the present invention. In accordance with the present invention, the identification codes are assigned to indicate their order in time relative to one another, and thus be indicative of their relative order in a predictable sequence. For example, consecutive numbers or alphanumeric codes may be used, such as 001 for a first message, 002 for a second message, etc. Accordingly, the event processing method includes assigning a next sequential identification code ("sequence code") to the new record, as shown at step 18 in FIG. 1.

In accordance with the present invention, each record 24*a*, 24*b*, 24*c* . . . in the shadow table 22 also includes information relating to an event that is to be communicated to other software applications. It should be noted, however, that this information may be actual data to be communicated or a reference to additional data in the main table that needs to be included in the message. Therefore, it is not necessary to include all relevant event data in the shadow table. Instead, a reference can be included in the shadow table that can be used to access additional event data from the main table 20. For example, the reference can be a unique identification (ID) code, such as a bid ID, item ID, account ID, etc. Accordingly, the shadow table 22 is more than a mere history of occurrence of events.

In one embodiment, each type of event is stored in a separate shadow table, and thus multiple shadow tables exist to accommodate multiple different types of events. Optionally, only a single HWM table is maintained in which each record corresponds to one of the multiple shadow tables. Alternatively, multiple HWM tables may be maintained.

Unlike conventional persistent stores, which stored indices as tables separate from the shadow tables, the shadow table 24 of the present invention is structured as a high performance persistent store structure, such as an Index Ordered Table (IOT) in the context of Oracle databases. In high performance persistent store structures, the index table is stored along with the data in the shadow table, i.e. they share common storage. Accordingly, use of this structure allows for efficient processing by eliminating a query "hop" from the index table to the shadow table. Accesses may be made by sequence code. Accordingly, the shadow table 24 includes an index 28 usable to quickly identify the records 26*a*, 26*b*, 26*c*, etc. in the shadow table 22.

It should be appreciated from FIG. 2 that the status field is eliminated from the shadow table 22. The present invention minimizes persistent store server load by reducing the quantity of writes to the persistent store by eliminating the need to update a status field every time a message is sent. Instead, the present invention uses an additional table, referred to herein as the "high water mark table" 30, as discussed further below.

This event processing method repeats to capture event information and populate the persistent store for subsequent events.

Normal Publication

As the persistent store is updated, information must be communicated to other software applications within the enterprise computer system so that such applications can act on the updated persistent store. The present invention operates on a "push" model whereby new information is actively and automatically communicated to such other applications by publication of messages to those applications. This occurs as part of the normal publication process described herein with reference to FIG. 3.

In one embodiment, OCI is used to access an Oracle database. In other embodiments, a corresponding standard API is used to access the persistent store. Accesses may be made through a database "view". Metadata information is obtained for the view using a standard API call. All columns in the view are published. The metadata is used to dynamically construct a select statement that accesses all rows. With this functionality, no code changes are required to support new subjects. The only change to support a new subject is to add the subject and its related information to the configuration. To handle schema changes, the metadata is periodically refreshed. The view can also be used to control what columns are published in the message. Only columns in the view will be published.

As discussed above, the present invention provides for use of a high water mark (HWM) table 30. Preferably, this HWM table has a record for each publishing view or shadow table so that the corresponding high water mark is uniquely identified for each event type being published. Further, each record in the HWM table stores the sequence code of the last record from the corresponding shadow table that was published by message in a previous batch of published messages. Accordingly, the high water mark table 30 includes a record that serves as a pointer to the last published record 26*c* in the shadow table 22, so that the system has a record of where it left off in publishing records/messages during a prior publication session. Therefore, there is no need to update each and every record in the shadow table 22 to reflect a publication status. Accordingly, the high water mark table may be updated on a periodic basis, e.g. every minute after multiple messages, instead of after each message. This significantly reduces the number of writes to the shadow table, write operations being one of the most resource-intensive operations in a persistent store.

On invocation, the high water mark table is used to identify a corresponding sequence code of the last message published. This provides an indication of the point from which publication should begin/resume. Subsequently, the persistent store is checked periodically for new messages that need to be published. Optionally, the last sequence code published is updated in memory, so there is no need to read the high water mark table until the next startup/initialization.

Figure 3:
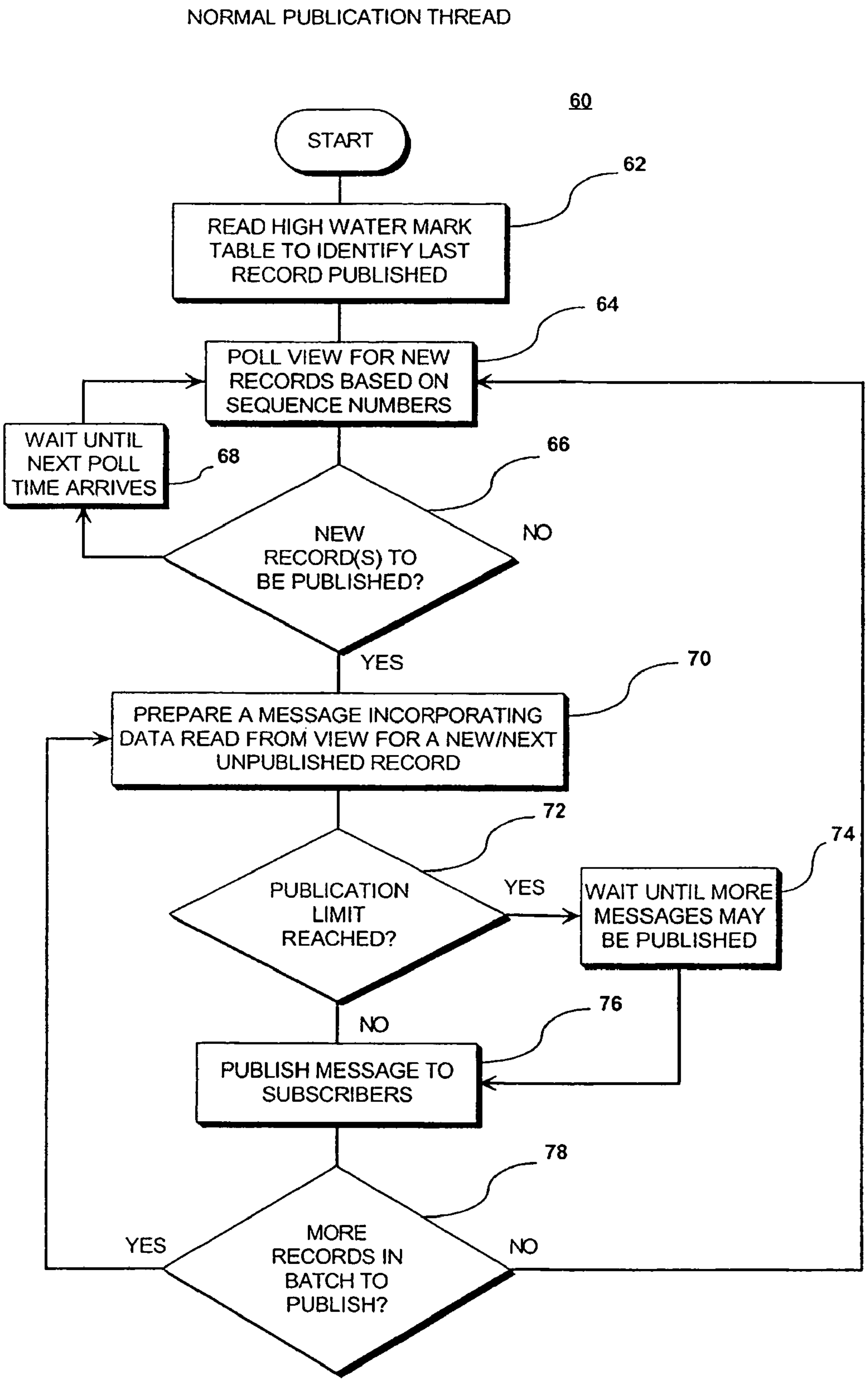
FIG. 3 is a flow diagram illustrating an exemplary publication method in a normal publication mode in accordance with the present invention.

As part of a normal publication processing thread, the HWM table is read on startup to identify the sequence code of the last record published, as shown at step 62 of flow diagram 60 of FIG. 3. The view, which is effectively a superset of the shadow table that includes information from the shadow table and information from the main table that may be included in the message, is periodically polled to determine whether there are any new records that need to be published, as shown at steps 64 and 66. By using the view, it is possible to read all data for a message in a single query operation, without need to read the main table separately if polling continues. If the highest sequence code in the shadow table 22 is higher than the highest sequence code in the high water mark table, then it is determined that there are new records to be published. When the view is polled the sequence codes of any new records to be published are retrieved, as well as any event related data from the shadow table and the main table. Preferably, all of this information is retrieved at the same time in a single read operation.

It should be noted that the number of records to be read at a time is configurable, and is preferably a number larger than one so that multiple records are read in batch to reduce the number of reads from the persistent store. By way of example, this number could determine the range used for EBAY_SEQUENCE in the following SQL statement:

SELECT <columns> FROM <view> WHERE EBAY_SEQUENCE >=? AND EBAY_SEQUENCE is <=? ORDER BY EBAY_SEQUENCE The polling rate is preferably configurable and can be adjusted to selectively modify the number of messages handled in batch, and to selectively increase or decrease the overall number of persistent store accesses.

Optionally, an overall maximum number of messages to send per second for each subject is a configurable parameter. This maximum may be used to spread messages out over time instead of sending out spikes of messages in short periods of time. This maximum number will determine how much time must elapse between the sending of two messages.

In contrast to conventional shadow tables having both a status and an identification code, which required that two conditions be checked when querying the shadow table, the present invention requires reading of only a sequence code.

With respect to retrieval of batches of records from the persistent store, each record corresponds to one message to be published. Assuming the batch size is N, programs traditionally made one query to get the N records, but such programs only retrieve a subset of the data needed. For each of the N records, another query was made to get the remaining information. So, conventional programs may make 1+N total queries.

In contrast, according to the present invention, the system makes one query and retrieves all the information it needs for the entire batch. It does not need to make subsequent queries.

Messages are then published in a conventional manner. Such publication involves preparing a message incorporating data read from the main and/or shadow tables 20, 22 for a new/next record to be published, and publishing the message, as shown at steps 72, 74 and 76. A conventional message publication mechanism, such as multicasting may be used to publish messages. Such publication communicates event related information to any other applications that need such information, such as subscribing applications, so that they can act on such information to perform their respective functions.

It should be noted that multiple messages may be published in batch during this step. Optionally, the number of messages to be published in batch is configurable such that a controlled and/or limited number of records are read from the shadow table during each poll of the shadow table and/or are published in batch. The smaller the number, the more throttling will occur because another database access is required to publish more messages. If a record/message publication limit is used, it is determined whether the limit has been reached, and if not, and there are more new records to be published, publication continues, as shown at steps 76, 78, 72, and 74.

If the publication limit has been reached, then publication of messages is interrupted as shown at step 74. After enough time has elapsed when throttling is no longer needed, then publication of messages resumes.

Figure 4:
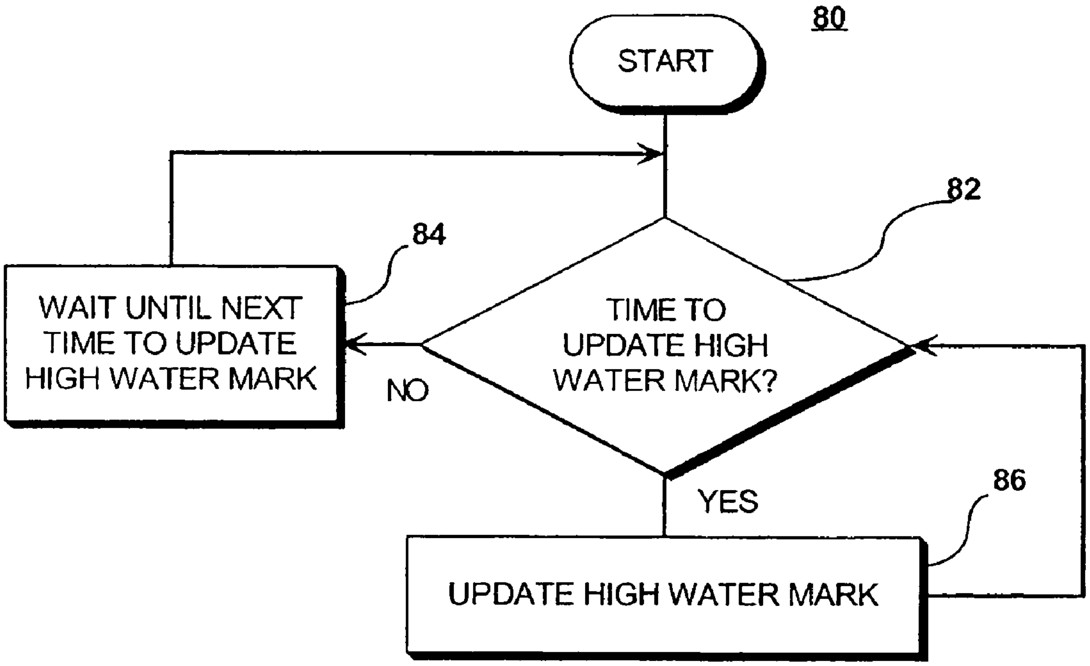
FIG. 4 is a flow diagram illustrating an exemplary method for updating the high water mark, in accordance with the present invention.

A separate processing thread handles updating of the high water mark table for all subjects, as shown in the flow diagram 80 of FIG. 4. The frequency of updating this table is configurable. As shown in FIG. 4, the system waits a prescribed time before updating the high water mark, as shown at steps 82 and 84. When it is time to update the high water mark, as shown at step 86, an entry is written to the high water mark table 30 (FIG. 2) to identify the sequence code of the last record published. In a preferred embodiment, the high water mark table in the persistent store is read only once upon start-up/initialization. After that, the HWM value is updated in memory and the persistent store value is updated accordingly. The updates to the persistent store are needed for the next time that thread starts up and needs to resume publication by publishing the next sequential message.

Alternatively, if the record publication limit has not yet been reached, and there are no more records to be published at the current time, then publishing of messages continues until the limit has been reached or there are no more messages to publish.

The normal publication and high water mark threads repeat to publish subsequent records created in the persistent store, etc.

Optionally, the number of messages to send per second may be configurable as a maximum to provide a definitive throttling parameter. Even if the polling rate is set to a low number or a large number of records is read during a single persistent store access, this maximum number of messages will limit the rate at which those records will be published. It may be preferable to read a relatively large number of records in a single read operation, and then publish the individual messages at a controlled rate in smaller batches, than to make multiple persistent store reads of smaller number of records.

During normal publication, the persistent store is accessed for records to publish, each access being made by sequence code(s). It is possible that the requested sequence is not found because the sequence is not in the shadow table or not in the view. For example, this can happen when a sequence is consumed but not used, when the sequence has already been deleted from the shadow table during a normal cleanup process, or when the record for this sequence has been removed from the main table. In such an event, there is a readily apparent gap in sequence codes and the system has the option of sending a missing record message immediately. It can also add the sequence to a missing record cache. This optimizes processing by subscribers because they do not need to send a recovery request for the sequence. Instead, they find out immediately that the sequence is missing. This optimization is optional and can be controlled by a flag in a configuration file. The flag can be turned on when the applications that change the main table use auto-commit. In this case, any persistent store change made by the application is committed right away. Without auto-commit, the sequence held by the application does not show up in the shadow table until the commit occurs. This may result in temporary sequence gaps that are filled in as soon as the application commits. These sequences will be missed during normal publishing and must rely on the recovery mechanism to send them out. In this case, the system does not treat these sequences as missing.

Recovery Publication

It should be appreciated that conventional programs, such as ADB, manage publication of notification messages, but do not handle recovery requests for messages that have not been received by a subscribing application. These recovery requests can occur if a subscribing software application fails to receive a particular message. When this happens, the subscriber sends a recovery request. When using popular conventional programs such as ADB, there is a need for a separate specialized software application because the conventional programs cannot handle recovery requests. However, the present invention provides for processing of such recovery requests and thus eliminates the need for such a separate application. This eliminates one "moving part" in the system, which simplifies deployment, monitoring and maintenance.

Accordingly, in addition to the normal publication operating thread discussed above, a recovery publication operating thread is also provided. Recovery publication occurs in response to a subscriber's issuance of a recovery request. Each recovery request identifies one or more messages that it failed to receive, and thus that need to be resent. The recovery request identifies such message by including the corresponding sequence codes discussed above. The request can be for a range of sequence codes or an individual sequence code.

Subscribing applications review the sequence codes of messages they have received. While reviewing the messages, it is determined whether any messages have been missed. Because consecutive and/or other numbers having a predictable sequence are used, a missing message can be identified by looking for a gap in the sequence of the sequence codes. For example, if messages having sequence codes 001 and 003 have been received, it is readily apparent that a message having a sequence code of 002 has been missed. This reviewing and monitoring continues until a gap in sequence codes is detected. If it is determined that one or more messages have been missed by a particular subscribing application, the subscribing application issues a recovery request by transmitting the sequence codes that are missing. These recovery requests are received and processed by the operating program module.

Figure 5:
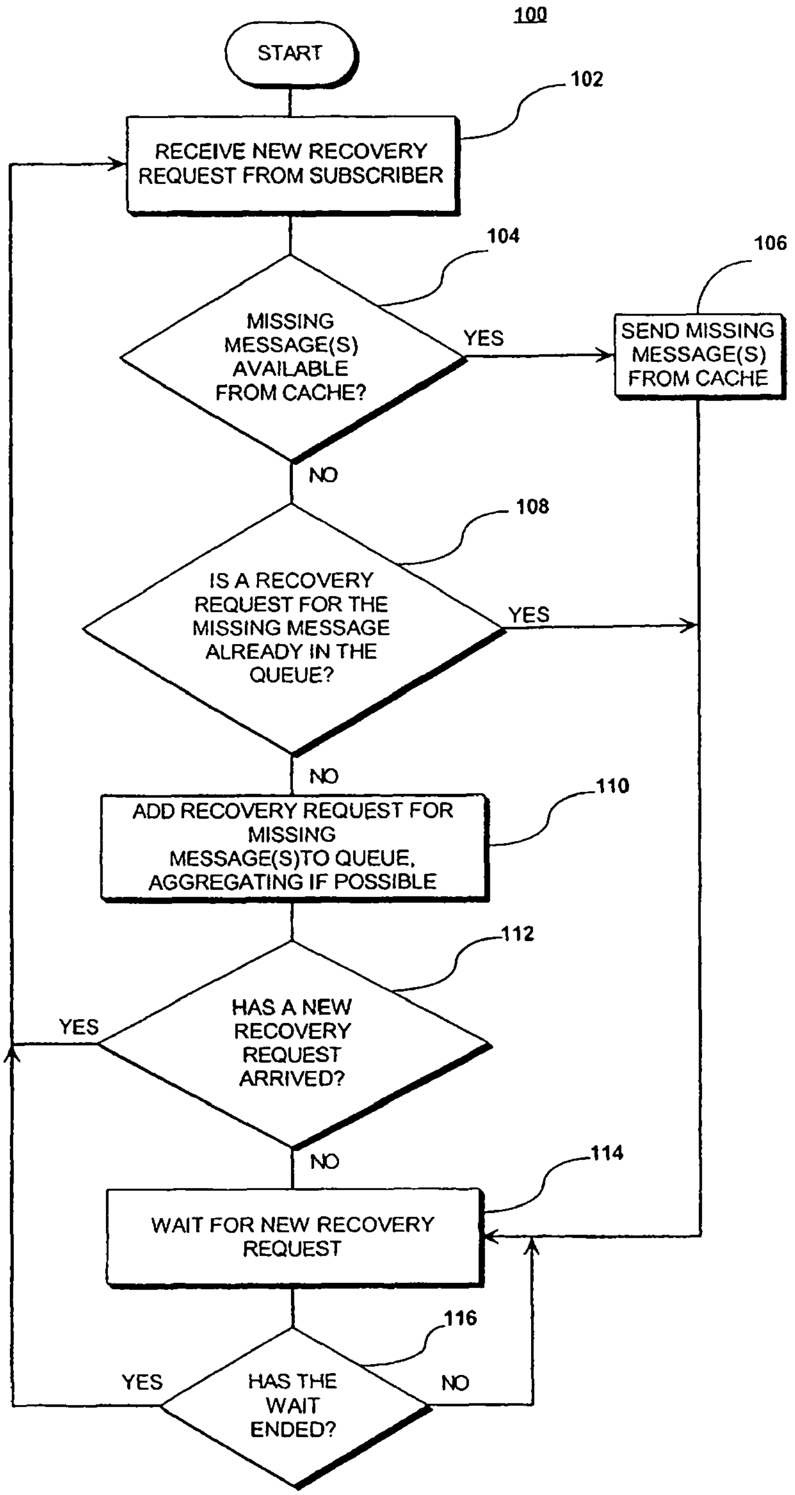
FIG. 5 is a flow diagram illustrating an exemplary recovery requesting processing method, in accordance with the present invention.

FIG. 5 is a flow diagram 100 illustrating an exemplary method for a recovery request thread that receives recovery requests from subscribing applications and places them in a queue. As shown in FIG. 5, the thread begins with receipt of a new recovery request from a subscriber, as shown at step 102. The recovery request identifies one or more sequence codes that are missing, and thus is a request for one or more missing messages having the corresponding sequence codes. It is next determined if the missing messages are available from a cache, and if so the missing message(s) is/are sent from the cache to the subscribing application, as shown at steps 104 and 106.

For such messages not available from the cache, persistent store access is required. A corresponding recovery request is then placed in a queue that is used to hold and aggregate recovery requests. Preferably, each subject has a separate queue to hold recovery requests. By using the queue, a single access of the store persistent store can be used to retrieve a batch of multiple records, thus avoiding the need for a resource intensive persistent store access operation for each missing message.

Optionally, the system may then check whether a request for the missing message is already in the queue, as shown at step 108. If so, there is no need to add a duplicate request, and thus the system awaits a next new recovery request, as shown at step 114.

However, if there is no such request in the queue, then a corresponding recovery request for the missing message is added to the queue, as shown at step 110. Preferably, each queue element includes the time the first request came in. An aggregation period may be provided for aggregation of requests so that multiple records may be retrieved during a single persistent store access operation.

The system then waits for new recovery requests, and the process repeats, as shown at steps 112, 114 and 116. Accordingly, the recovery request thread continually places recovery requests in a queue.

Figure 6:
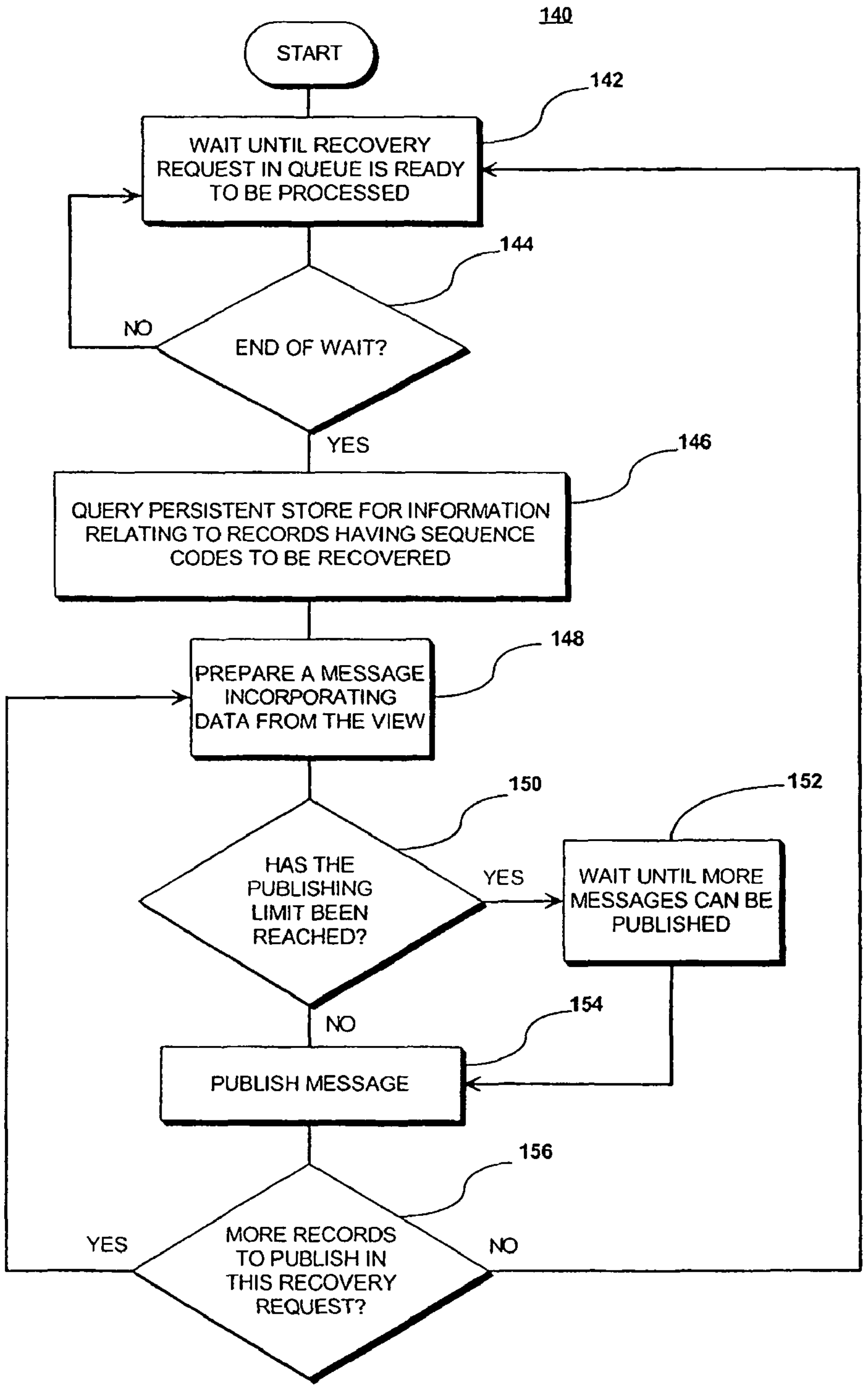
FIG. 6 is a flow diagram illustrating an exemplary publication method in a recovery publication mode, in accordance with the present invention.

FIG. 6 is a flow diagram 140 illustrating an exemplary method of recovery publication whereby recovery requests in the queue are processed and messages are republished in a recovery publication mode. Referring now to FIG. 6, the method begins with waiting until there are recovery requests in the queue that are ready to be processed, as shown at steps 142 and 144. This may involve waiting a period of time until there is a group of multiple recovery requests in the queue.

After expiration of the wait period, the recovery publication thread queries the persistent store, namely the view (i.e. the information from the shadow and/or main tables), to retrieve the information relating to records having the sequence codes corresponding to the sequence codes of the missing messages identified in the recovery requests, as shown at step 146. For example, one of the following queries may be used for this purpose:

SELECT <columns> FROM <view> WHERE EBAY_SEQUENCE >=? AND EBAY_SEQUENCE is <=?; or SELECT <columns> FROM <view> WHERE EBAY_SEQUENCE IN (?, ?, ?, ?, ?, ?, ?, ?, ?, ?, ?, ?).

The exemplary first query is the same one used during normal publication and may be used for a sequence range. The exemplary second query may be used for individual sequences.

Once the records are retrieved, at least one corresponding message is compiled to incorporate data from the view, as shown at step 148.

Because it may be undesirable to allow recovery requests to cause a spike in persistent store load, the system may limit the number of persistent store accesses allowed for recovery. For example, there may be a limit on the number of rows that can be read or published for each subject in a given time period. Because messages can vary greatly in size from one subject to another, the throttling parameter may be specified on a per subject basis. Accordingly, in the example of FIG. 6, it is determined whether a publishing limit has been reached, as shown at step 150. If so, the system waits until more messages can be published, e.g. by waiting a prescribed period of time, as shown at step 152. If the limit has not yet been reached, the message will be published, as shown at step 154. Publication occurs by retransmitting to the subscribing applications the missing message in a manner similar to that described above for the normal publication thread, as described above.

If there are more records to publish for a particular recovery request, the method repeats with preparation of a next message, checking an applicable limit, and publishing the message, etc., as shown in steps 156, 148, 150, 152 and 154. If there are no more records to publish, the thread repeats by waiting for a next recovery request, as shown at steps 156 and 142.

A queue element can contain a higher sequence range than one persistent store access. In this case, the thread does not remove the complete element from the queue. Instead, the sequence range of that element is reduced and the element remains at the top of the queue. Once the complete sequence range is processed, then the element is removed from the queue. Optionally, the queue will have a limited size. If the size is exceeded, the system will stop accepting new recovery requests until there is room in the queue.

Automatic Detection of Changes in the Persistent Store

It is very likely that the main table will change over time. New columns may be added as new features are added. Existing columns may change to hold different types of data (e.g. a number, some text, an object). Also, some columns may be deleted if they are no longer needed. Whenever these changes occur in the main table, conventional solutions usually need to be reconfigured so that they know about the changes. A list of all columns and their types are stored in a configuration file. Accordingly, if any column changes, the configuration file must be changed by a software developer, and the application must be stopped and restarted to use the new configuration.

In contrast, the present invention does not store this data in its configuration file. Instead, it dynamically determines what columns exist and what type of data is stored in each column. It stores this information in memory and periodically refreshes the data to automatically detect changes. Thus, the configuration file does not need to be reconfigured and the application does not need to be stopped/restarted.

The present invention preferably accesses a view instead of directly accessing the main table. Accordingly, the operating program module is de-coupled from any direct knowledge of the main table. The view provides greater flexibility in determining what data to include in the published messages. All columns in the view are published, so columns can be selectively added or removed from the view to control what data is in the message. The persistent store is queried for metadata information about the view. The metadata information includes the names of the columns along with their types (e.g. string, number, object). The metadata is used to dynamically construct a select statement that accesses all rows. It is also used when constructing the message because the column names are used as fields in the message and the type information is included in the message. Finally, it is used by the subscribing applications to determine what fields are included in the message and what their types are. By using a view and by querying the persistent store for the view's metadata information, the operating program module is de-coupled from the attributes of the data. It can dynamically determine what data to retrieve from the persistent store and what data to include in the message. As new events or subjects are added, the operating program module only needs to know what view to access for each event. No code changes are required. The only change to support a new subject is to add the subject and its related information to the configuration. To handle schema changes, the metadata is periodically refreshed. The VIEW can also be used to control what columns are published in the message. Only columns in the view will be published.

As discussed above, conventional programs keep a list of columns and their types in a configuration file. This means that whenever a new message is transmitted for the first time, the conventional program must be configured to recognize the columns in the main table. Creating the configuration requires developer resources and time. Because the present invention allows for automatically and dynamically reconfiguring itself, this step is eliminated and new messages can be published sooner, without the need for developer resources and time, after implementation of a change in the persistent store structure, etc.

Monitoring and Diagnostic Capability

Optionally, a program module in accordance with the present invention provides an HTTP interface that provides the following functionality: a diagnostic display page referred to herein as a "Validate Internals" page, and a periodic publishing of monitoring heartbeats with latest state information. See FIGS. 7-14. This Validate Internals page allows the application to expose internal information to show how the application is configured and allow validation that the internal data appears correct. Thus this page facilitates monitoring of the application.

Figure 7:
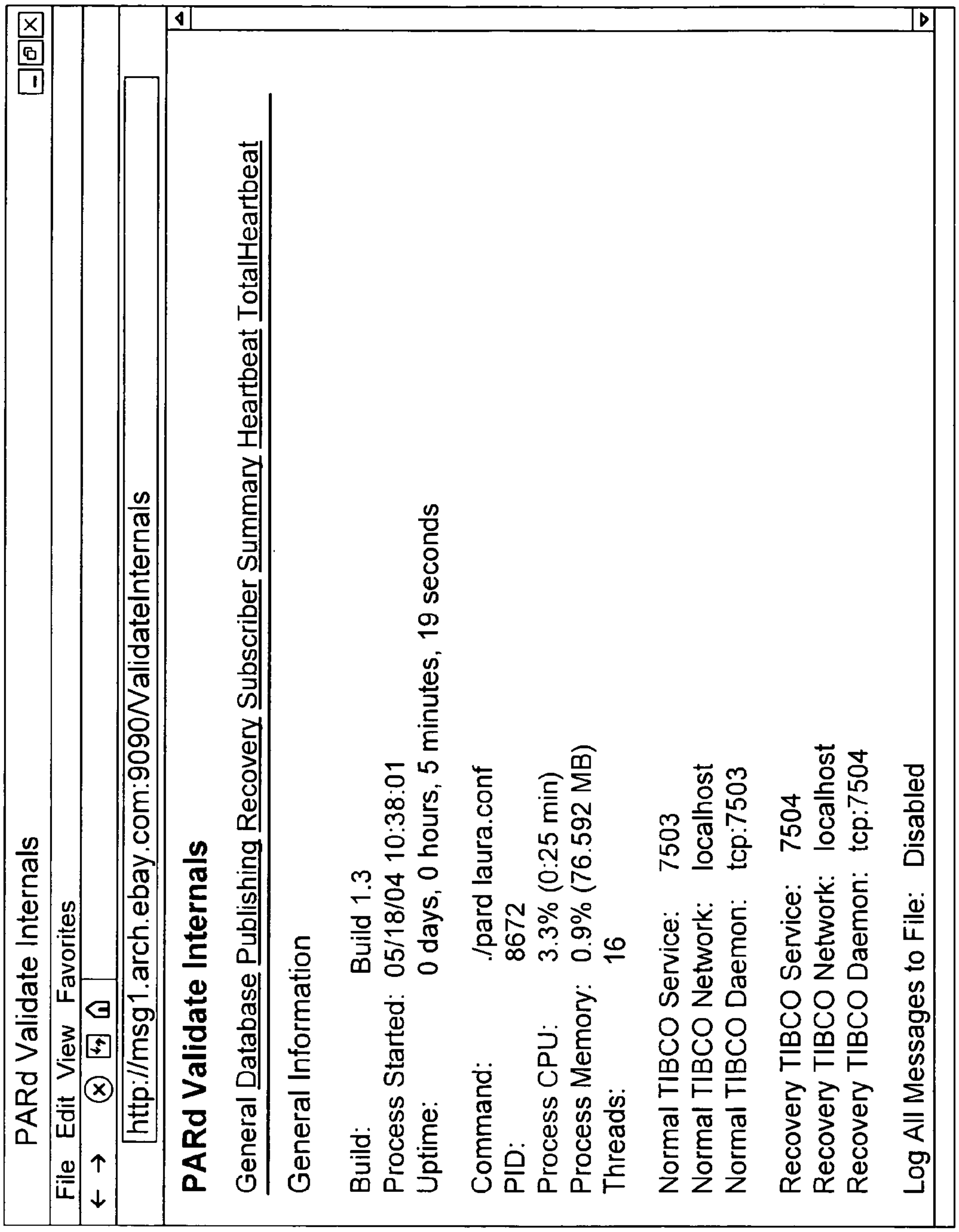
Figure 8:
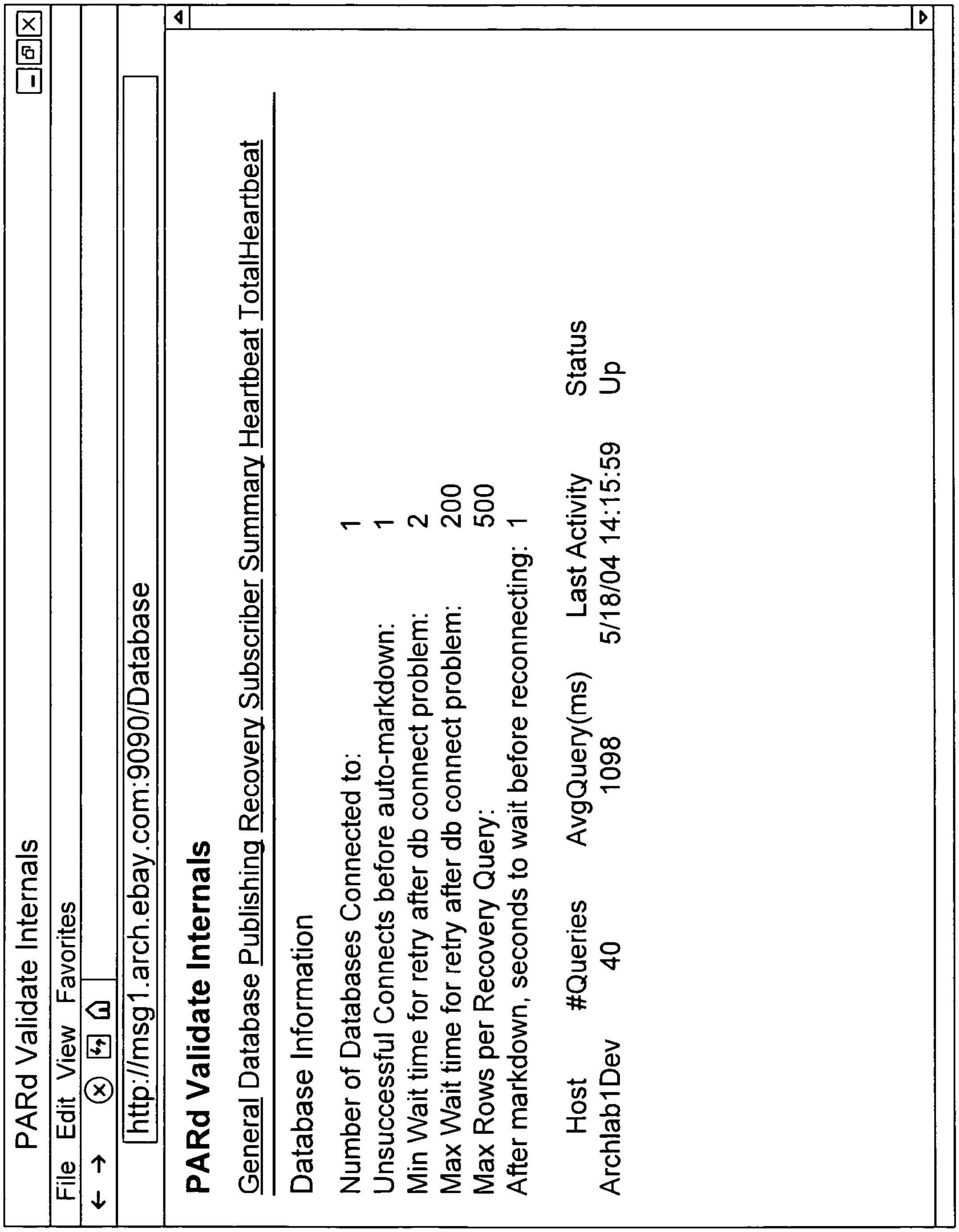
Figure 10:
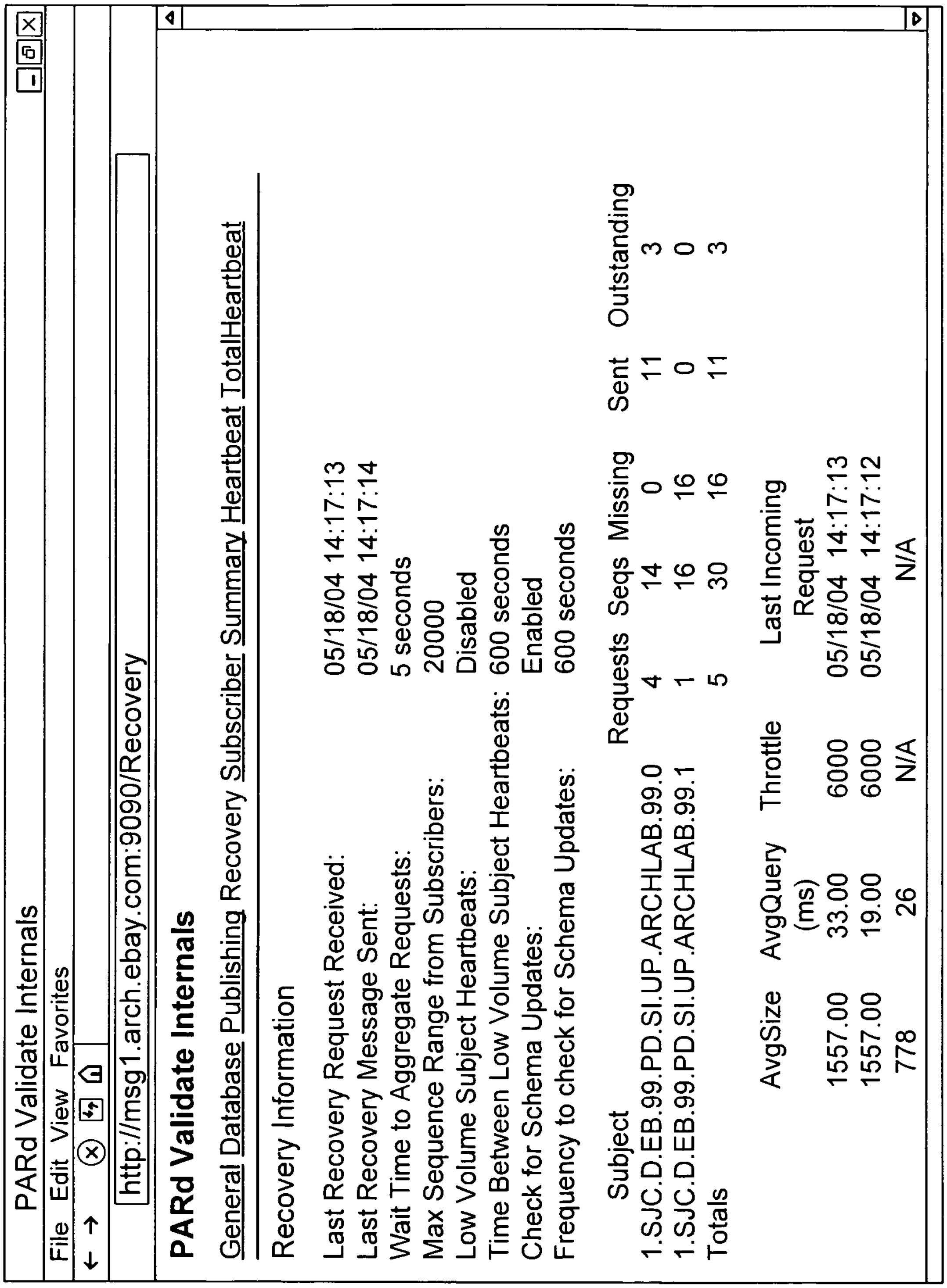

The Validate Internals page provides configuration information and statistics information. The page can be used by various operations, engineering, and/or quality assurance personnel, etc. to verify the configuration, troubleshoot problems and monitor the process. Validate Internals is preferably configured as a "read-only" page. An exemplary Validate Internals page is shown in FIG. 7.

Listed below are various exemplary diagnostic and browser screen shots illustrating the present invention's monitoring and diagnostic capability. In summary, a program module can bring up a browser showing functionality and various statistics. These statistics include, but are not limited to: how many messages it has processed; how many queries have been made to access the persistent store; various statistics relating to publishing; how many recovery requests came in from different applications that did not get it the first time; how many recovery messages were sent; how many missing record messages have been sent; which subscriber is requesting recovery at this point; when the last access to the persistent store occurred; when the last message was sent; how many recovery requests are currently in the queue; what are the min/max/average sizes of messages; how much memory is being used; and how much CPU is being used. These statistics can be used by monitoring applications and to identify trends, etc.

Heartbeats for Monitoring and Diagnostics

Optionally, the present invention is implemented in a program module that is configured to automatically send out monitoring heartbeats that include information on what has changed since the last heartbeat and cumulative totals for a respective instance.

Heartbeats consist of name-value pairs and may include some of all of the following information: per subject information on how many messages are published, persistent store query times, last sequence published, last polling time, last publishing time and backlog information, number of recovery requests received, number of recovery messages sent, number of missing record messages sent, max recovery queue size, number of persistent store queries made, CPU and memory used.

These heartbeats can be used to graph information. In one embodiment, heartbeats are available by HTTP interface using the URL http://<server_name>:<port>/Heartbeat (FIG. 13) for what has changed since the last heartbeat and http://<server_name>:<port>/TotalHeartbeat (FIG. 14) for cumulative totals for this instance. Alternatively, heartbeats are available via the Tibco Information Bus by listening on the subject specified in the configuration file under a designated parameter, such as MonHeartbeatSubject. As another alternative, heartbeats may be made available as a text file on local disk. The name of the file is specified in the configuration file, e.g. under parameter MonHeartbeatFile. The frequency used to generate heartbeats may be configurable through another designated parameter, e.g. MonHeartbeatSecs.

The program module is optionally configured to keep track of the last time it polled the shadow table and to include this information in its heartbeat data. This information can be used to detect if the normal publishing thread is not functioning correctly.

Low Volume Subject Heartbeats

Some tables have very few inserts/updates, e.g., in which a new row is inserted once a day. When publishing these tables, it is difficult for subscribers to determine if they missed any messages because they must wait until the next message is sent. For these low-volume subjects, the present invention may provide for periodically publishing the last sequence that was used. Subscribers can listen to these messages and determine immediately if they are missing any messages.

Unlike conventional recovery agent software, the present invention does not need an extra persistent store access to find out the last sequence that was published. Because it handles normal publishing, it will already know what was the last sequence published.

Subscriber Identification

To easily identify which subscriber is making recovery requests, additional fields may be added to each recovery request. These additional fields identify the hostname and process id of the subscriber. The hostname information may be determined by using the HOSTNAME environment variable.

This information is used to collect total recovery requests from each subscriber. The Validate Internals page may display these totals. This will easily identify if there is one subscriber that is requesting a large number of recovery messages.

Figure 11:
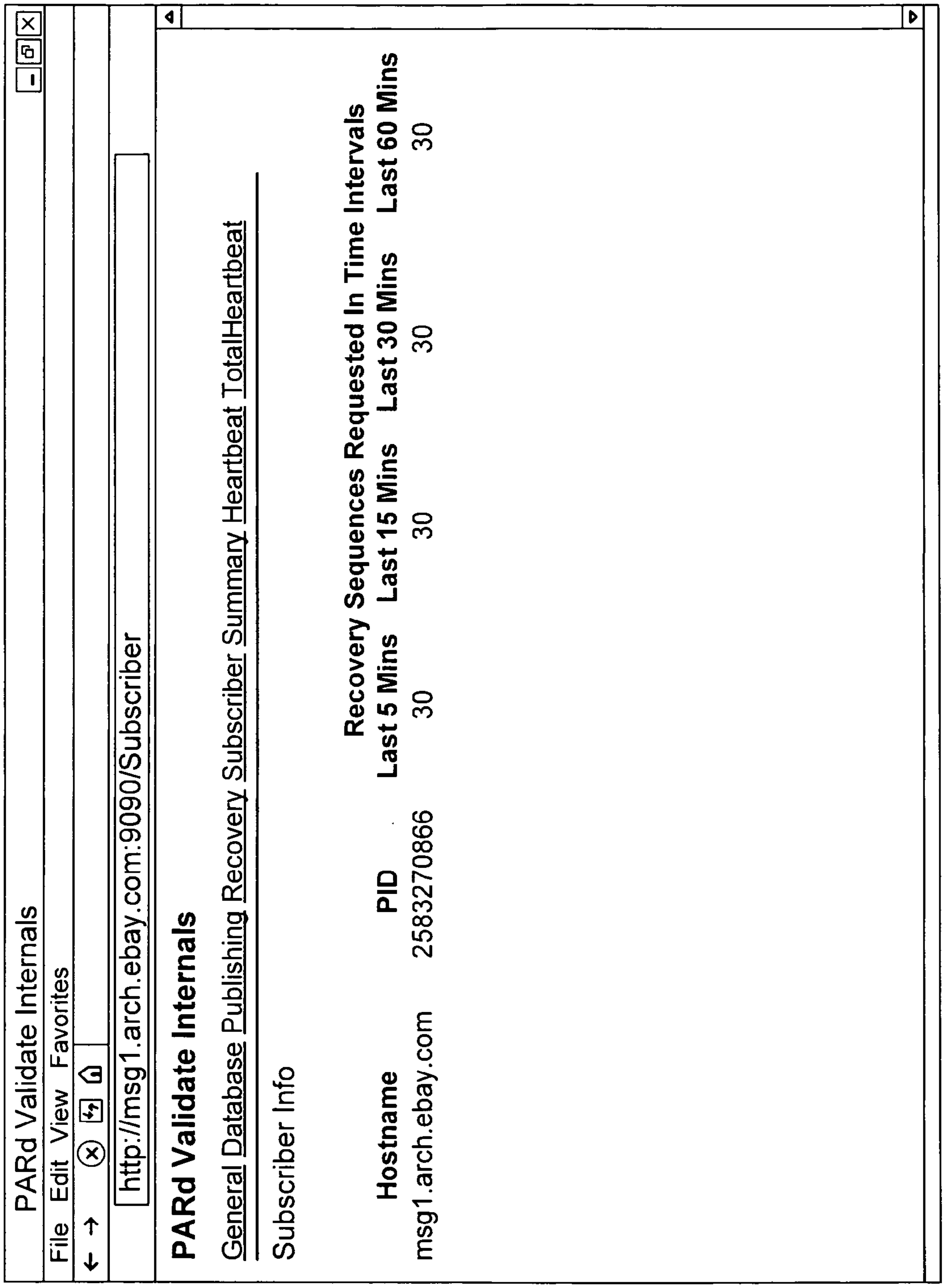
Figure 12:
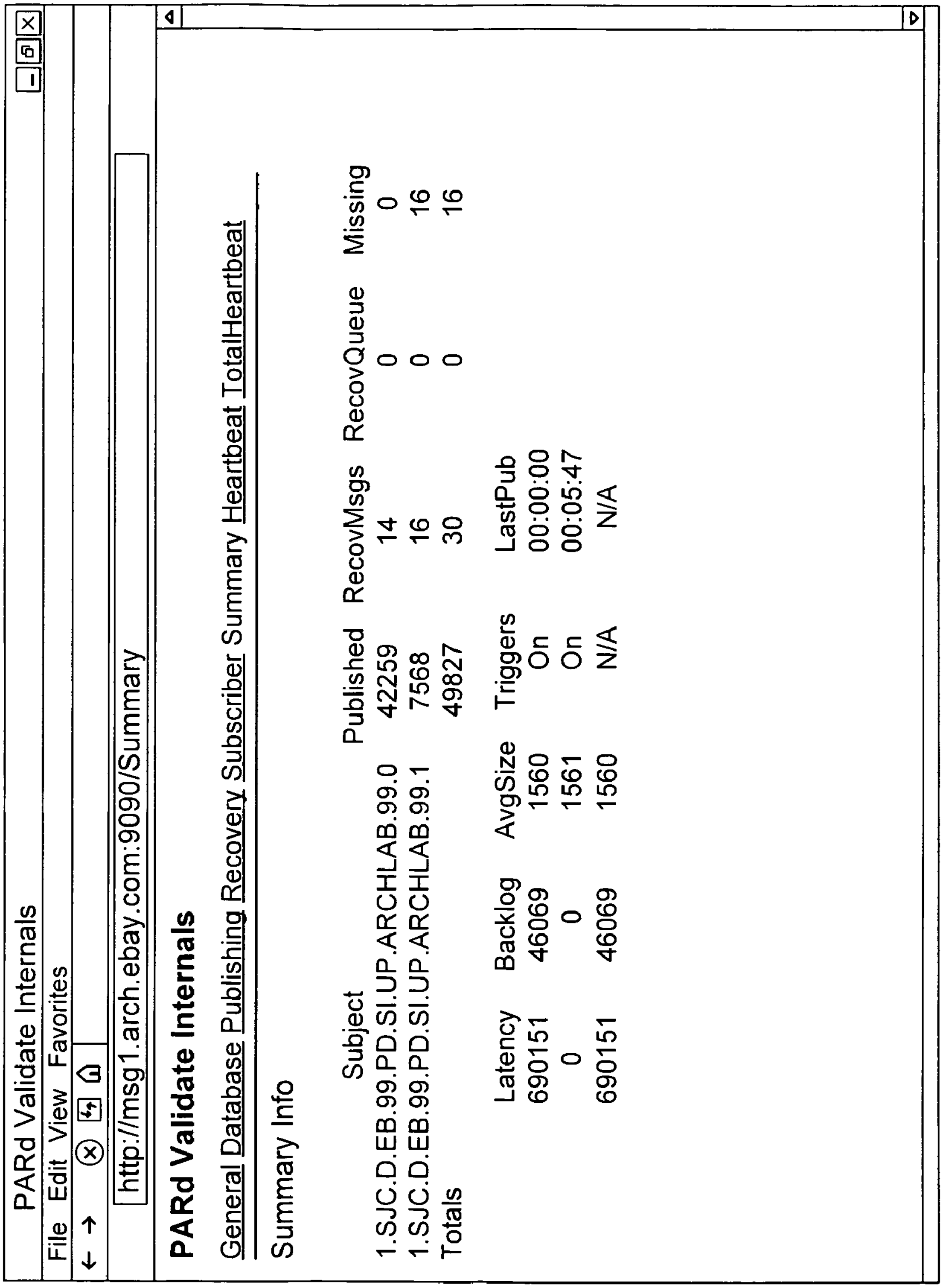
Figure 13:
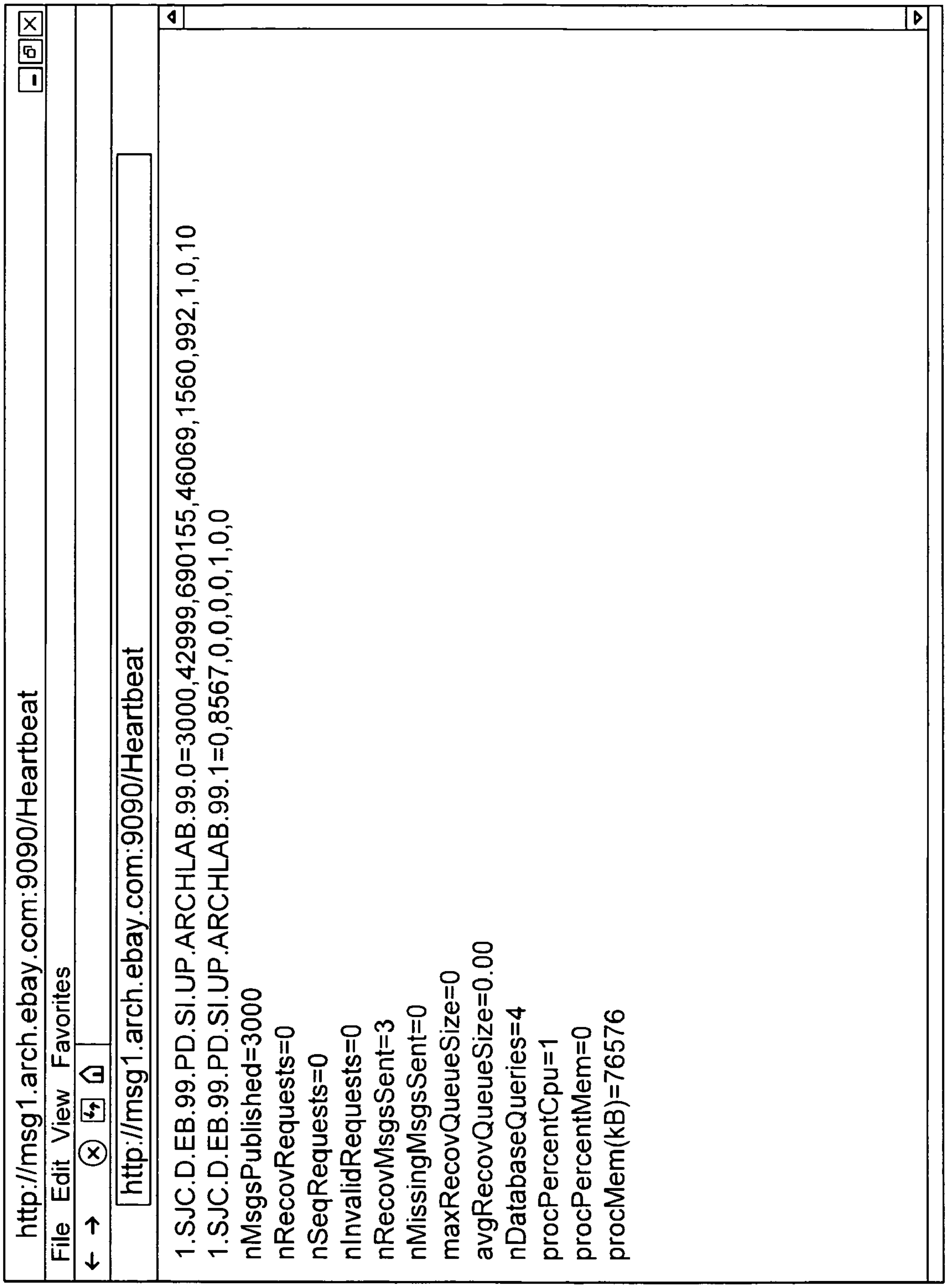
Figure 14:
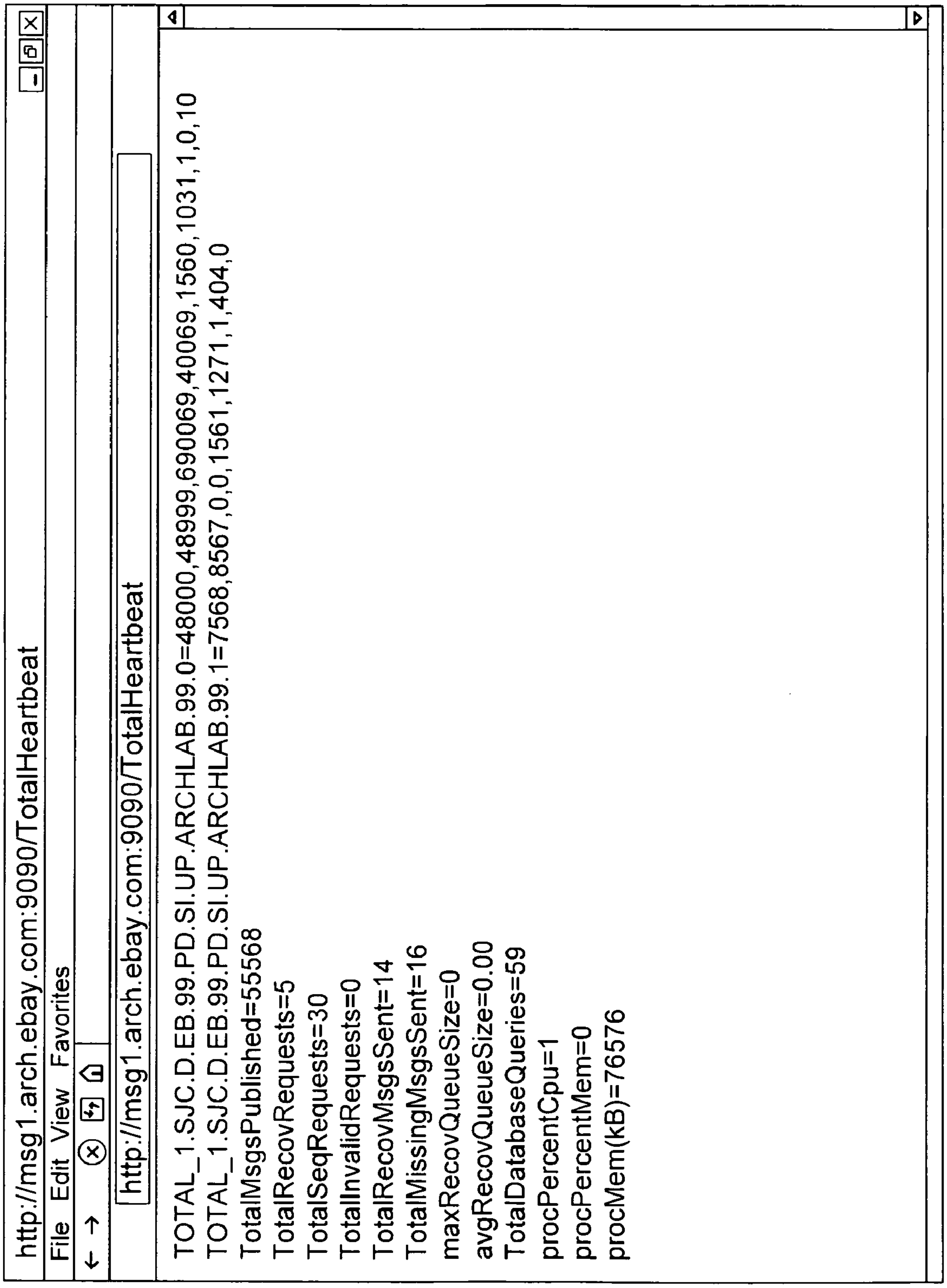

These statistics may be "aged out" over a period of time (e.g. one hour). Subscribers who have not made any new recovery requests in a certain time window may be removed from the list. Totals for each subscriber may preferably represent only a certain time window. FIG. 11 shows an exemplary display of these statistics.

Marking Down of Persistent Store

The present invention may provide for detecting when a persistent store is not responding, and to responsively mark it down. Detection may be performed by counting the number of consecutive failures from the persistent store. After the number exceeds a configurable threshold, the persistent store is marked down. This means the system will stop accessing the persistent store and will stop publishing. Polling of the shadow table will stop and all incoming recovery requests will be dropped. After a configurable time has elapsed, the system will try again to connect to the persistent store. This cycle will continue until it can re-establish connection to the persistent store or it exhausts the number of retries.

Computer Platform

Figure 15:
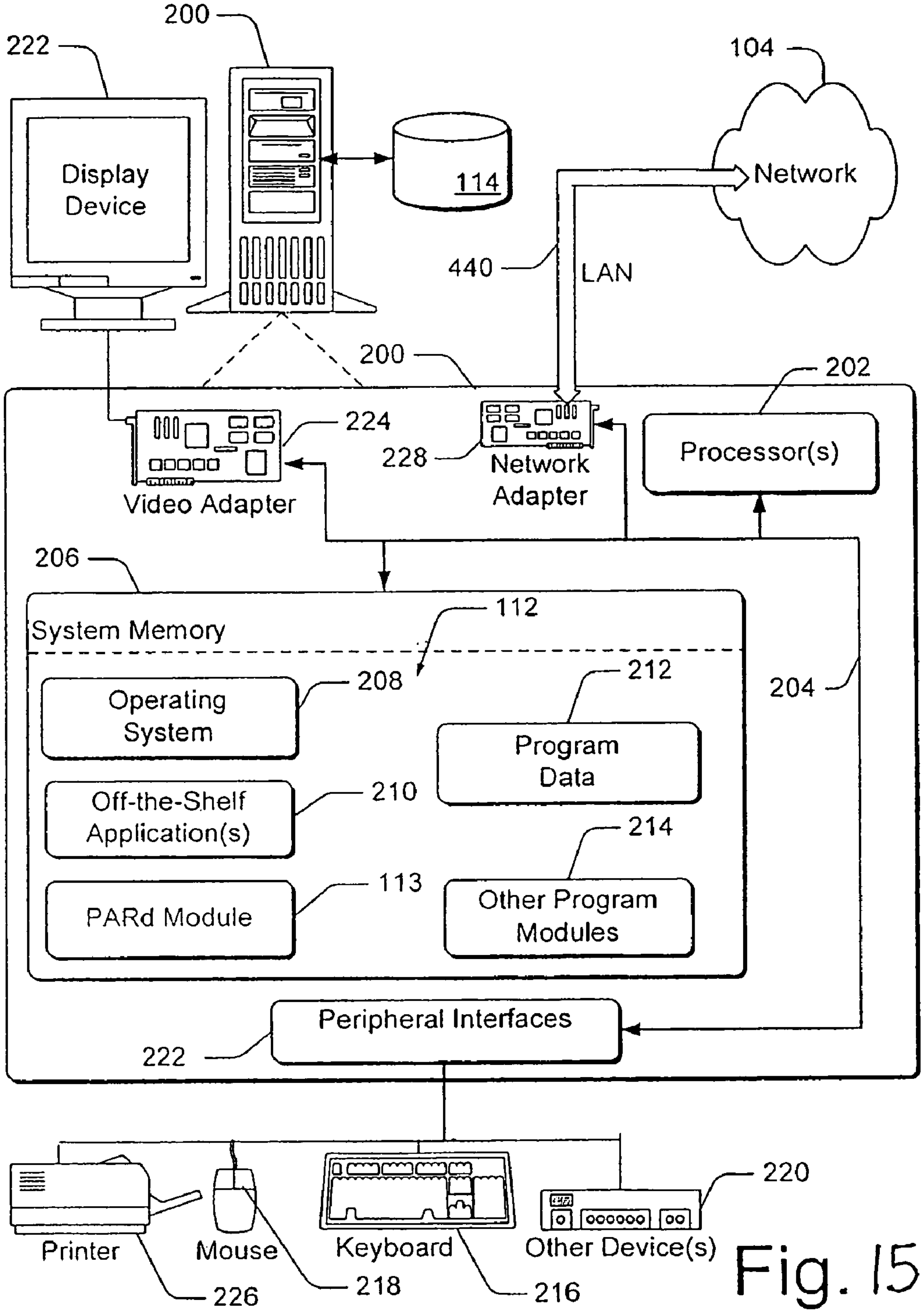
FIG. 15 is a diagrammatic view of an exemplary computer system in accordance with the present invention.

FIG. 15 is a block diagram showing an example computer 200 within which various functionalities described herein can be fully or partially implemented. Computer 200 can function as a server, a personal computer, a mainframe, or various other types of computing devices. It is noted that computer 200 is only one example of computer environment and is not intended to suggest any limitation as the scope or use or functionality of the computer and network architectures. Neither should the example computer be interpreted as having any dependency or requirement relating to anyone or combination of components illustrated in FIG. 15.

Computer 200 may include one or more processors 202 coupled to a bus 204. Bus 204 represents one or more of any variety of bus structures and architectures and may also include one or more point-to-point connections.

Computer 200 may also include or have access to memory 206, which represents a variety of computer readable media. Such media can be any available media that is accessible by processor(s) 202 and includes both volatile and non-volatile media, removable and non-removable media. For instance, memory 206 may include computer readable media in the form of volatile memory, such as random access memory (RAM) and/or non-volatile memory in the form of read only memory (ROM). In terms of removable/non-removable storage media or memory media, memory 206 may include a hard disk, a magnetic disk, a floppy disk, an optical disk drive, CD-ROM, flash memory, etc.

Any number of program modules 112 can be stored in memory 206, including by way of example, an operating system 208, off-the-shelf applications 210 (such as e-mail programs, browsers, etc.), program data 212, the PARd software application referred to as reference number 113 in FIG. 15, and other modules 214. Memory 206 may also include one or more persistent stores 114 containing data and information enabling functionality associated with program modules 112.

A user can enter commands and information into computer 200 via input devices such as a keyboard 216 and a pointing device 218 (e.g., a "mouse"). Other device(s) 220 (not shown specifically) may include a microphone, joystick, game pad, serial port, etc. These and other input devices are connected to bus 204 via peripheral interfaces 222, such as a parallel port, game port, universal serial bus (USB), etc.

A display device 222 can also be connected to computer 200 via an interface, such as video adapter 224. In addition to display device 222, other output peripheral devices can include components such as speakers (not shown), or a printer 226.

Computer 200 can operate in a networked environment or point-to-point environment, using logical connections to one or more remote computers. The remote computers may be personal computers, servers, routers, or peer devices. A network interface adapter 228 may provide access to network 104, such as when network is implemented as a local area network (LAN), or wide area network (WAN), etc.

In a network environment, some or a" of the program modules 112 executed by computer 200 may be retrieved from another computing device coupled to the network. For purposes of illustration, the PARd operating program module 113 and other executable program components, such as the operating system, are illustrated herein as discrete blocks, although it is recognized that such programs and components reside at various times in different storage components remote or local, and are executed by processor(s) 202 of computer 200 or remote computers.

Program Module

Techniques and functionality described herein may be provided in the general context of computer-executable instructions, such as program modules, executed by one or more computers (one or more processors) or other devices. Generally, program modules include routines, programs, objects, components, data structures, logic, etc. that perform particular tasks or implement particular abstract data types. Typically, the functionality of the program modules may be combined or distributed as desired in various embodiments. It is noted that a portion of a program module may reside on one or more computers operating on a system.

An implementation of these modules and techniques may be stored on or transmitted across some form of computer readable media. Computer readable media can be any available media that can be accessed by a computer. By way of example, and not limitation, computer readable media may comprise volatile and non-volatile media, or technology for storing computer readable instructions, data structures, program modules, or other data.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for publishing information to a plurality of software applications comprising:

identifying, based on a last sequential identification code in a high watermark table of a persistent store, a plurality of records to transmit to the plurality of software applications, the plurality of records generated subsequent to a previous record corresponding to the last sequential identification code;

preparing a plurality of corresponding messages, each corresponding message corresponding to a record of the plurality of records;

transmitting each message of the plurality of corresponding messages to at least one software application of the software applications, the plurality of corresponding messages including a most recent message corresponding to a most recent record; and storing, in the high water mark table of the persistent store, an updated last sequential identification code corresponding to the most recent message transmitted in the plurality of corresponding messages, the updated last sequential identification code being stored as a pointer for subsequent reference.

2. The method of claim 1, wherein each record of the plurality of records is associated with an occurrence of an event in which the persistent store is modified.

3. The method of claim 1, wherein the identifying of the plurality of records to transmit is based, in part, on a request for retransmission of the previous record corresponding to the last sequential identification code.

4. The method of claim 1, further comprising:

receiving a request for retransmission of a message corresponding to a particular record, the particular record being identified in the request by a particular respective identification code; and retransmitting the message corresponding to the particular record.

5. The method of claim 4, further comprising:

adding the request for retransmission to a queue;

intermittently processing a plurality of requests for retransmission in the queue, the processing for each request comprising retrieving information from the persistent store and preparing a corresponding message including the retrieved information.

6. The method of claim 5, further comprising:

awaiting elapse of a predetermined period of time between adding the request for the retransmission to the queue and retransmitting the message.

7. The method of claim 5, further comprising:

deleting from the queue a duplicate request identical to another request in the queue.

8. The method of claim 4, further comprising:

retrieving the message corresponding to the particular record from a cache.

9. The method of claim 1, wherein at least a first portion of each record of the plurality of records is stored in a main table of the persistent store and at least a second portion of each record is stored in a shadow table of the persistent store.

10. The method of claim 9, wherein the shadow table is configured as an index ordered table.

11. The method of claim 9, wherein the second portion and the first portion contain overlapping data.

12. The method of claim 9, wherein the shadow table includes the contents of each record and a corresponding sequential identification code of each record.

13. The method of claim 1, further comprising:

periodically updating the high water mark table using a timer.

14. The method of claim 1, wherein the preparing of the plurality of corresponding messages comprises reading the plurality of records from a view.

15. The method of claim 1, wherein the plurality of software applications comprises independent software applications.

16. A system to publish information to a plurality of software applications, the system comprising:

a processor;

a memory operably connected to the processor; and instructions stored in the memory and executable by the processor to cause said system to:

identify, based on a last sequential identification code in a high watermark table of a persistent store in a memory of a computer system, a plurality of records to transmit to the plurality of software applications, the plurality of records generated subsequent to a previous record corresponding to the last sequential identification code;

prepare a plurality of corresponding messages, each corresponding message corresponding to a record of the plurality of records;

transmit each message of the plurality of corresponding messages to at least one software application of the plurality of software applications, the plurality of corresponding messages including a most recent message corresponding to a most recent record; and store, in the high water mark table of the persistent store, an updated last sequential identification code corresponding to the most recent message transmitted in the plurality of corresponding messages, the updated last sequential identification code being stored as a pointer for subsequent reference.

17. The system of claim 16, wherein at least a first portion of each record of the plurality of records is stored in a main table of the persistent store and at least a second portion of each record is stored in a shadow table of the persistent store.

18. The system of claim 16, wherein each record of the plurality of records is associated with an occurrence of an event in which the persistent store is modified.

19. A non-transitory computer-readable medium having computer program instructions embodied thereon, the computer program instructions executable by one or more processors to perform a method for publishing information to a plurality of software applications, the method comprising:

identifying, based on a last sequential identification code in a high watermark table of a persistent store in a memory of a computer system, a plurality of records to transmit to the plurality of software applications, the plurality of records generated subsequent to a previous record corresponding to the last sequential identification code;

preparing a plurality of corresponding messages, each corresponding message corresponding to a record of the plurality of records;

transmitting each message of the plurality of corresponding messages to at least one software application of the computer system, the plurality of corresponding messages including a most recent message corresponding to a most recent record; and storing, in the high water mark table of the persistent store, an updated last sequential identification code corresponding to the most recent message transmitted in the plurality of corresponding messages, the updated last sequential identification code being stored as a pointer for subsequent reference.

20. The non-transitory computer-readable medium of claim 19, wherein the method further comprises:

receiving a request for retransmission of a message corresponding to a particular record, the particular record being identified in the request by a particular respective identification code; and retransmitting the message corresponding to the particular record.

* * * * *